Figure 1:
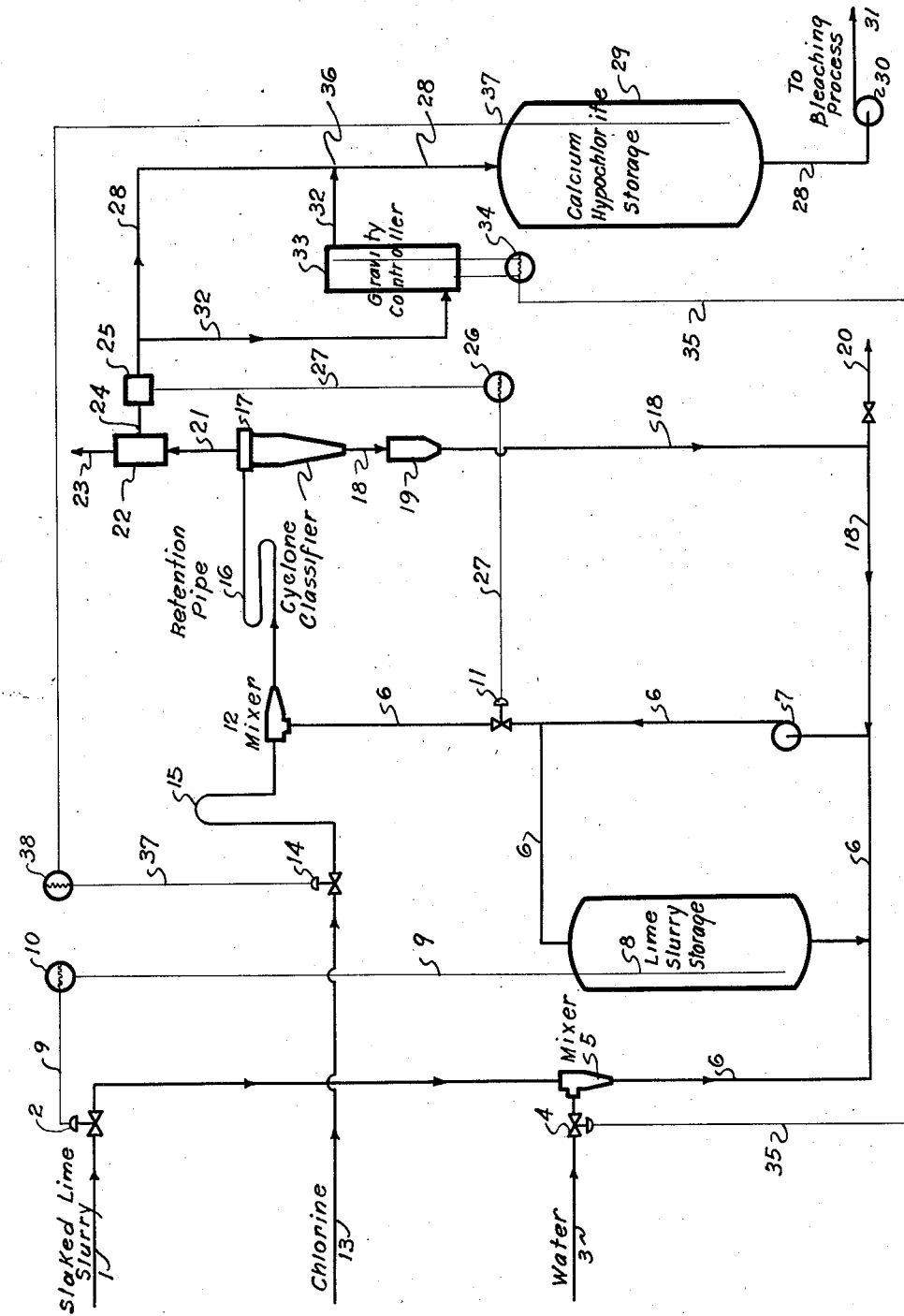

United States Patent Office 2,889,199
Patented June 2, 1959

2,889,199
PROCESS FOR PRODUCTION OF CALCIUM HYPOCHLORITE BLEACH LIQUOR

Wesley M. Osborne, Tacoma, Wash., Dexter Edge, Jr., Niagara Falls, N.Y., and Arthur D. Johnston, Milton, Wash., assignors to Hooker Chemical Corporation, a corporation of New York Application December 2, 1955, Serial No. 550,546

3 Claims. (Cl. 23—86)

This invention relates to a continuous process for production of calcium hypochlorite bleach liquor. More particularly, this invention relates to a continuous, automatic process for production of semiclarified calcium hypochlorite bleach liquor.

In the prior art method of preparing calcium hypochlorite bleach liquor, milk of lime is chlorinated, in accordance with the following reaction:

(1)  $2Ca(OH)_2 + 2Cl_2 \rightarrow Ca(OCl)_2 + CaCl_2 + 2H_2O$

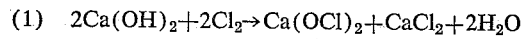

The calcium hydroxide is derived from the hydration of calcium oxide which in turn is produced by the roasting of naturally occurring calcium carbonate. The latter is never found in a pure state, but contains foreign matter, some of which is of a siliceous nature, such as sand and is highly insoluble. The calcium hydroxide itself is of low solubility and as milk of lime is largely in a state of suspension. In addition to the insoluble matter above mentioned, there is always present a certain portion of insoluble carbonates, some of which may be a residue of the original calcium carbonate. Additional calcium carbonate may be formed during the hydration of the lime by absorption of carbon dioxide from the atmosphere. Unless this insoluble matter is removed from the bleach liquor before it is used in a paper pulp process, some of it will appear in the finished paper as specks, discolorations and rough spots. In the prior art it has been the practice to allow the sludge to settle and decant off the clear liquor. This method of course involves the waste of any excess undissolved calcium hydroxide that may be present. The settling of the sludge and decanting off of the liquor is an operation usually requiring a period of approximately 5 to 12 hours. Further, this settling necessitates the installation of large capacity tanks and involves additional supervision, thus adding appreciably to the cost of the bleaching operation. When the suspension of lime in water is chlorinated to produce calcium hypochlorite which may be in solution, solids present or formed must be separated from the solution and then discarded if the process is not designed to handle this material.

If over-chlorination results as often happens in a batch-type process, a deficiency in calcium hydroxide results and the following reaction occurs:

(2)  $Ca(OCl)_2 + 2Cl_2 + 2H_2O \rightarrow 4HOCl + CaCl_2$

The hypochlorous acid decomposes quite readily as follows:

(3)  $2HOCl \rightarrow O_2 + 2HCl$

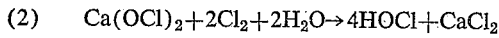
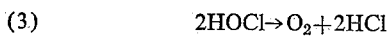

After Reaction 3 has taken place a portion of the chlorine becomes unavailable, and thus it is clear that the favorable condition for promoting Reaction 1 requires the presence of calcium hydroxide in excess of the unreacted chlorine present. To prevent Reactions 2 and 3 it is customary to use an excess of calcium hydroxide often as high as 10 percent. Another method of preventing Reactions 2 and 3 consists in decreasing the amount of chlorine supplied toward the end of the reaction. The latter method is not particularly practical since it is not representative of standardized manufacturing operations and therefore requires especially close observation by very skilled operators. Thus in the prior art, it has been difficult to maintain a process for the production of calcium hypochlorite wherein suspended lime has not been present in the product, and wherein all of the chlorine and lime has been utilized.

It is the main object of this invention to provide a continuous, automatic process for the production of semi-clarified calcium hypochlorite bleach liquor wherein stability and uniformity of bleach liquor are improved, thus resulting in a consistently better quality of product. Further, it is an object of this invention to utilize substantially all of the chlorine and lime and thus to remove the losses inherent with the conventional batch systems. Still further, it is an object of this invention to provide a more economical process wherein space requirements, installation and maintenance costs are reduced considerably. Other objects will become apparent to those skilled in the art on consideration of the complete specification and claims.

Figure 2:
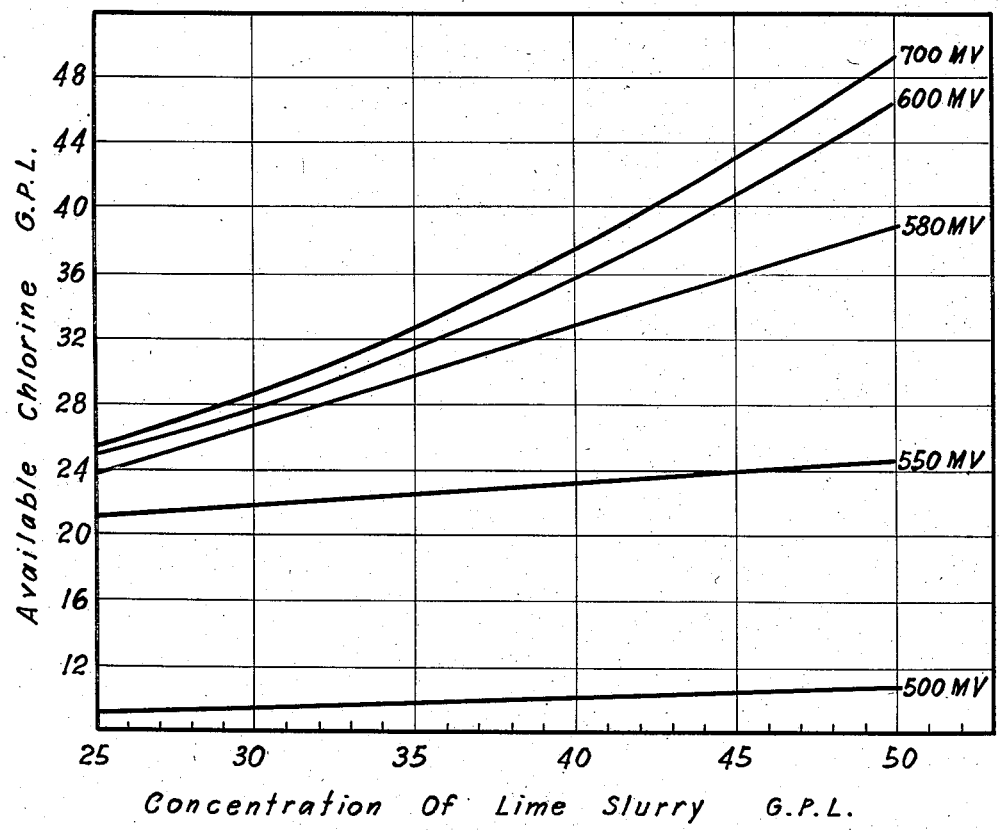

These and related objects are accomplished by the present invention which may be more easily understood by reference to the attached drawings. Figure 1 is a diagrammatic flow sheet of one preferred embodiment embraced within the scope of our invention. Figure 2 is a graph showing the variation of available chlorine (grams per liter) in the product with variation in lime feed concentration (grams per liter). The oxidation-reduction potential of the calcium hypochlorite bleach liquor product was measured in millivolts using a silver-platinum electrode cell at a temperature of 90 degrees Fahrenheit.

Referring to Figure 1: Dilute slaked lime slurry feed 1 controlled by valve 2 and water feed 3 controlled by valve 4 are mixed 5 to a predetermined concentration. The resultant lime slurry is transferred through line 6 by means of a pump 7 to a storage tank 8. A change in the level of the material in the storage tank is transmitted 9 to a level indicator controller 10 which actuates the slaked lime feed control valve 2. The lime slurry is transferred from the storage tank 8 by means of the pump 7 through line 6, and the feed is controlled by valve 11 to the mixer 12. Chlorine feed 13 controlled by valve 14 is passed through a barometric leg 15 into the mixer 12. The resultant mixture is passed through a retention pipe 16 to a liquid cyclone classifier 17. The underflow 18 of the classifier passes through a recycle cup 19 and then through 18 into the lime slurry line 6. A drain 20 may be provided to remove the non-lime insolubles. The overflow liquid 21 from the classifier is fed through a degasser 22. Any gases present may be vented 23 to a recovery system not shown. The liquid stream 24 is passed through an electrode assembly 25 of an oxidation-reduction potential controller 26. This instrument is preset at a value dependent upon the available chlorine desired in the finished bleach liquor and the concentration of the lime slurry. The output 27 of this controller is used to regulate the lime slurry feed valve 11 to the mixer 12. The main product stream 28 is passed to the product storage tank 29. The product may be transferred by a pump 30 to a bleaching process 31. A minor portion of the product stream 32 may be passed through a gravity instrument 33. A gravity controller 34 automatically controls 35 the water flow valve 4. After passing through the gravity instrument the stream joins the main product stream 36. The level of the product in the storage tank may be in communication 37 with a level indicator controller 38 which will automatically regulate the chlorine flow valve 14.

Referring to Figure 2: From this graph it can be seen that starting with a lime slurry concentration from 25 to 50 grams per liter that any concentration from 8 to 50 grams per liter of available chlorine in the product may be obtained by presetting the oxidation-reduction controller at a value determined from the graph. For example if it were required to produce finished bleach liquor containing 28 to 30 grams per liter of available chlorine from dilute lime slurry controlled at between about 31 and 33 grams per liter respectively, the desired result may be accomplished by presetting the potential controller at about 590 millivolts.

We have now found a continuous, automatic process for the production of semi-clarified hypochlorite bleach liquor which comprises mixing a controlled lime slurry feed and chlorine, and passing this mixture through a retention conduit for a time sufficient to effect the desired chlorination. Then, the mixture so produced is passed through a liquid classifier wherein the underflow of the classifier is recycled to the lime slurry feed and the overflow of the classifier is recovered as calcium hypochlorite bleach liquor. A portion of this product is passed through a measuring means wherein said means provides an impulse to an electrometric controller, said controller producing a corrective action, in accordance with said controller set point, to reposition the lime slurry feed valve thereby controlling the lime slurry flow rate.

The following example further illustrates our invention but it is to be understood that the specific details given in the example have been chosen for the purpose of illustration and are not intended to limit our invention except as defined in the appended claims.

Example 1

In a method similar to the foregoing description of the process, dilute lime slurry (30.5 grams per liter) controlled at about 14 gallons per minute and at a temperature of 75 degrees Fahrenheit or less was fed into a stream of chlorine 13 (2 pounds per minute) which is under pressure of 25 to 35 pounds per square inch gauge. Liquid chlorine may be used where reliable means of accurate and safe control is available. The reaction mixture was passed through a pipe section 16 (15 foot length, 2 inch diameter) to provide the violent turbulence necessary for quick reaction. The pressure at the entrance to the classifier was approximately 10 pounds per square inch gauge. The mixture was passed through a liquid cyclone classifier 17, such as the two-inch diameter DorrClone (porcelain Model P-50). The underflow 18 (4 gallons per minute and containing 18.5 grams per liter of calcium hydroxide) was discharged freely into a recycle line which returned the solids to the suction side of the lime slurry pump. A drain 20 on the recycle line was used to periodically purge the system of heavy non-lime particles which gradually build up. The overflow 21 (10 gallons per minute containing particles less than 50 microns) from the classifier was piped directly into a four-inch diameter degasser 22. The finished bleach liquor 24 was conducted from the degasser to the calcium hypochlorite storage tank 29. A portion of the finished bleach liquor was transferred through an electrode assembly 25 of an oxidation-reduction potential controller 26. The set point of the controller was about 640 millivolts using calomel-platinum electrodes; and under these conditions the feed line to the calcium hypochlorite storage tank was analyzed and found to contain: 30 grams per liter of available chlorine; 0.13 percent suspended solids; 0.0 gram per liter suspended calcium hydroxide; and 0.45 gram per liter dissolved calcium hydroxide.

Any method of mixing the lime slurry and chlorine wherein the violent turbulence necessary for quick reaction and low volume hold-up is provided, will be satisfactory. In order to insure the completion of the calcium hypochlorite reaction, a conduit which may be in the form of a loop or an S may be installed between the mixer and the liquid cyclone classifier or a conduit of extended length may be used alone. This conduit is sized to produce turbulent flow and to provide a retention time preferably less than 10 seconds at the minimum expectant flow rate; for example, an S-shaped conduit of one-inch diameter standard pipe, twenty-six feet in length was satisfactory for a flow rate of thirteen gallons per minute.

The liquid classifier is required to handle a relatively large flow of liquid and of necessity the mixture contains lime and often other materials in suspension. It is necessary to separate the finished liquor from such suspended materials and this may be conveniently done in any type of hydro-separating equipment which is of sufficient size and capacity so that the overflow of finished bleach liquor is relatively clear and relatively free from suspended materials and so that the hold-up time is comparatively short, for example 20 seconds or less. A DorrClone classifier (porcelain Model P-50) has met these requirements. The classifier underflow is allowed to discharge freely into a recycle line and since this liquid contains heavy particles, horizontal runs should be avoided to prevent settling and possible plugging. The underflow containing unreacted suspended lime particles and non-lime particles larger than 50 microns is continuously recycled to the mixer for further chlorination; thus the coarse lime is eventually consumed through reaction with some additional chlorine in each passage through the reaction zone. A drain on the recycle line is used to periodically purge the system of heavy non-line particles which gradually build up.

The preferred retention time from the initial mixing of the chlorine and lime slurry 12 to the completion of the separation of the overflow 21 and underflow 18 is between five and twenty seconds at the minimum flow rate. A retention time less than 5 seconds will not insure the completion of the calcium hypochlorite reaction, and a retention time greater than twenty seconds while it will provide a satisfactory product, the extended time will provide a process lag which is a detriment to satisfactory automatic control of the process.

The oxidation-reduction potential controller consists of a standard in-line type electrode assembly utilizing either silver-platinum or calomel-platinum electrode pairs. These electrodes are used as they do not show serious potential deviation when the bleach liquor temperature is varied; further, they were unaffected by variation in excess undissolved lime. The overflow stream of the liquid classifier or a portion thereof is passed through the electrode assembly. The oxidation-reduction potential controller having a range of 400 to 1000 millivolts is preset at a value dependent upon the concentration of the lime slurry feed and the available chlorine required in the finished product, this value being determined from Figure 2. The slow solution of coarse particles of suspended lime in the product will result in an unsteady, unpredictable potential and therefore removal of these particles before measuring the potential is necessary. The process may be controlled by pH methods since the pH changes rapidly at the reaction end point giving a curve similar in shape to E.M.F. curves; but oxidation potentials methods are preferred for reasons of simplicity and accuracy.

A gravity controller on the finished bleach liquor stream controls the bleach liquor strength between desired limits. This control is accomplished by the controller actuating the water control valve 4 as shown in Figure 1, according to changes in gravity of the product. A possible variation within the scope of this invention, is the dilution of the calcium hypochlorite product to the desired value, on completion of the classification step, rather than before the chlorination step. Any instrument which will control the product strength, such as a conductivity controller, may be used to obtain the desired results.

The sequence of instrument action which may result in this continuous, automatic process for the production of semi-clarified calcium hypochlorite bleach liquor is as follows: As the bleach liquor 28 flows to a process 31 such as bleaching pulp, a decline in the level of the material in bleach liquor storage tank 29 is transmitted 37 to a level controller 38 which actuates the chlorine valve 14 to increase the feed flow to the mixing zone 12 to provide more product. The resultant increase in available chlorine in the product reflects quickly on the oxidation-reduction potential recorder 26 which immediately actuates the lime slurry feed valve 11 to the mixing zone to provide enough lime for the increased chlorine. An increase in flow of lime slurry is recorded as a decline in the dilute slurry storage tank 8, thus the level controller 10 actuates the dilute slaked lime flow valve 2 to maintain the proper level in the dilute slurry storage tank. At this point the slaked lime feed to the waterslaked lime mixing zone 5 will increase above the desired concentration and the resultant lime slurry concentration will increase and therefore the product strength in line 32 will vary accordingly from the desired value. This change in product strength is recorded by the gravity controller 34 which automatically adjusts through line 35 the water feed valve 4 to bring the lime slurry concentration back to the desired value. Any type of pneumatically or electrically operated level, gravity and oxidation controllers may be employed in the process of this invention wherein a change in the value of the controlled variable is first asserted by a primary element and this change is communicated by the measuring element to the controlling means. This controller mechanism then produces a corrective action in the manipulated variable by energizing the power unit to reposition the final control element.

In the operation of the process of this invention it has been found that the process equipment may be constructed of the standard materials used for handling chlorine and calcium hypochlorite solutions below 110 degrees centigrade. Examples of these materials are glass, Pyrex, rubber, plastic-lined steel, or other corrosion-resistant materials such as Duriron.

It is to be understood that the above described arrangements are simply illustrative of the application of the principles of the invention. Numerous other arrangements may be readily devised by those skilled in the art which will embody the principles of the invention and fall within the spirit and scope thereof.

We claim:

1. A continuous process for the production of calcium hypochlorite bleach liquor which comprises: mixing a controlled lime slurry feed and a controlled chlorine feed; passing said mixture through a retention conduit for a time sufficient to effect the desired chlorination; then passing said mixture so produced through a liquid cyclone classifier; withdrawing the underflow of said classifier and recycling said underflow to the lime slurry feed; withdrawing the overflow of said classifier and recovering the calcium hypochlorite bleach product so produced; the concentration of said product being controlled by passing a portion of said product through a means to measure electrical conductivity of the product liquor, said means providing an impulse to an electrometric controller, said controller producing a corrective action in accordance with said controller set point to reposition the lime slurry feed valve thereby controlling the flow of lime slurry feed.

2. A process according to claim 1 wherein the underflow of said classifier is recycled to the lime slurry feed prior to the controlled lime slurry feed valve.

3. A continuous, automatic process for the production of calcium hypochlorite bleach liquor which comprises: mixing a controlled dilute lime slurry feed and a controlled water feed; passing said mixture through a controlled lime slurry feed valve; mixing said controlled lime slurry feed and a controlled chlorine feed; passing said mixture through a retention conduit for a time sufficient to effect the desired chlorination; then passing said mixture so produced through a liquid cyclone classifier; withdrawing the underflow of said classifier and recycling said underflow to the lime slurry feed line prior to the controlled lime slurry feed valve; withdrawing the overflow of said classifier and recovering the calcium hypochlorite bleach product so produced from a product stream; passing a portion of said product through an electrode assembly, said assembly providing an impulse to an oxidation-reduction potential controller, said controller producing a corrective action in accordance with said controller set point to reposition the lime slurry feed valve thereby controlling the lime slurry feed; passing a second portion of the product through a means for providing an impulse to a gravity controller, said gravity controller producing a corrective action to reposition the water feed valve thereby controlling the gravity of the product in said last named means, passing the total combined recovered product through a means for providing an impulse to a level controller, said level controller producing a corrective action to reposition the chlorine feed valve thereby controlling the product level in said last named means; said controlled dilute lime slurry feed being controlled by passing said feed through a means for providing an impulse to a level controller, said level controller producing a corrective action to reposition the dilute lime slurry feed valve thereby controlling the lime slurry level in said last named means.

References Cited in the file of this patent

UNITED STATES PATENTS

| 1,145,509 | Pike et al. | July 6, 1915 |
| 1,399,181 | Bascom | Dec. 6, 1921 |
| 1,450,023 | Edelman | Mar. 27, 1923 |
| 1,884,200 | Philipp | Oct. 25, 1932 |
| 2,320,635 | Mericola | June 1, 1943 |
| 2,587,845 | Heller | Mar. 4, 1952 |

OTHER REFERENCES

Dorr-Oliver Bulletin No. 2500, published by Dorr-Oliver Co., Inc. Stamford, Conn., 1951.

Dorr-Oliver Bulletin No. 2504, published by Dorr-Oliver Co., Inc. Stamford, Conn., 1955.

Pye: "The Control of Bleach Manufacture by Oxidation Potential." Journal of the Electrochemical Soc., vol. 97, No. 8, pp. 245-8. Publ. August 1950.